(12) United States Patent
Guerreiro

(10) Patent No.: US 10,521,890 B2
(45) Date of Patent: Dec. 31, 2019

(54) STATIC SOILING DETECTION AND CORRECTION

(71) Applicant: CONTINENTAL AUTOMOTIVE GMBH, Hannover (DE)

(72) Inventor: Rui Guerreiro, Hove (GB)

(73) Assignee: Continental Automotive GmbH, Hannover (DE)

(*) Notice: Subject to any disclaimer, the term of this patent is extended or adjusted under 35 U.S.C. 154(b) by 127 days.

(21) Appl. No.: 15/845,645

(22) Filed: Dec. 18, 2017

(65) Prior Publication Data

US 2018/0174277 A1  Jun. 21, 2018

Related U.S. Application Data

(63) Continuation of application No. PCT/EP2016/060379, filed on May 10, 2016.

(30) Foreign Application Priority Data

Jul. 2, 2015  (EP) ..................................... 15174934

(51) Int. Cl.
*G06T 5/00* (2006.01)
*G06T 7/00* (2017.01)
(Continued)

(52) U.S. Cl.
CPC ............... *G06T 5/005* (2013.01); *G06K 9/40* (2013.01); *G06K 9/4647* (2013.01);
(Continued)

(58) Field of Classification Search
CPC ................. G06T 5/005; G06T 7/0002; G06T 2207/30252; G06T 2207/20182;
(Continued)

(56) References Cited

U.S. PATENT DOCUMENTS

| | | | | |
|---|---|---|---|---|
| 6,965,395 | B1 * | 11/2005 | Neter | H04N 5/3675 348/129 |
| 2005/0069270 | A1 * | 3/2005 | De Sandro | G02B 6/02009 385/127 |

(Continued)

FOREIGN PATENT DOCUMENTS

| | | |
|---|---|---|
| DE | 1258403 B | 1/1968 |
| DE | 102011013527 A1 | 1/2012 |

(Continued)

OTHER PUBLICATIONS

Gu, Jinwei, et al, Removing Image Artifacts to Dirty Camera Lenses and Thin Occuluder, ACM Transactions on Graphics, vol. 28 No. 5, Article 144, pp. 1441-1550, Dec. 2009.

(Continued)

*Primary Examiner* — Qian Yang

(57) ABSTRACT

A method and device for detecting image artifacts. Pixel transition values of camera images are computed in a first direction by comparing intensity differences between neighboring pixels with an upper threshold and a lower threshold and setting a corresponding pixel transition value. A low pass filter with respect to time and a spatial filter are applied to the pixel transition values. Pixels of potential artifact regions are identified by comparing magnitude values of the smoothed pixel transition values with a predetermined detection threshold.

5 Claims, 11 Drawing Sheets

(51) Int. Cl.
*G06K 9/40* (2006.01)
*G06K 9/46* (2006.01)

(52) U.S. Cl.
CPC .. *G06T 7/0002* (2013.01); *G06T 2207/10016* (2013.01); *G06T 2207/20182* (2013.01); *G06T 2207/30168* (2013.01); *G06T 2207/30252* (2013.01)

(58) Field of Classification Search
CPC ........... G06T 2207/10016; G06T 2207/30168; G06K 9/40; G06K 9/4647
See application file for complete search history.

(56) References Cited

U.S. PATENT DOCUMENTS

| | | | | |
|---|---|---|---|---|
| 2007/0047834 A1* | 3/2007 | Connell | ................... | G06T 5/50 382/274 |
| 2016/0180504 A1* | 6/2016 | Kounavis | ................ | G06T 5/002 348/241 |

FOREIGN PATENT DOCUMENTS

| | | |
|---|---|---|
| EP | 2351351 B1 | 9/2015 |
| WO | 03060826 A1 | 7/2003 |

OTHER PUBLICATIONS

Zhou, Changyin, et al, "Removal of Image Artifacts Due to Sensor Dust," 2007 IEEE Conference on Computer Vision and Pattern Recognition, Minneapolis, MN, Jun. 2007, pp. 1-8.

Stack Overflow Community, How to calculate or approximate the median of a list without storing list.

International Search Report and Written Opinion dated Sep. 12, 2016 from corresponding International Patent Application No. PCT/EP2016/060379.

EP Search Report dated May 16, 2016 for corresponding German Patent Application No. 15174934.8.

\* cited by examiner

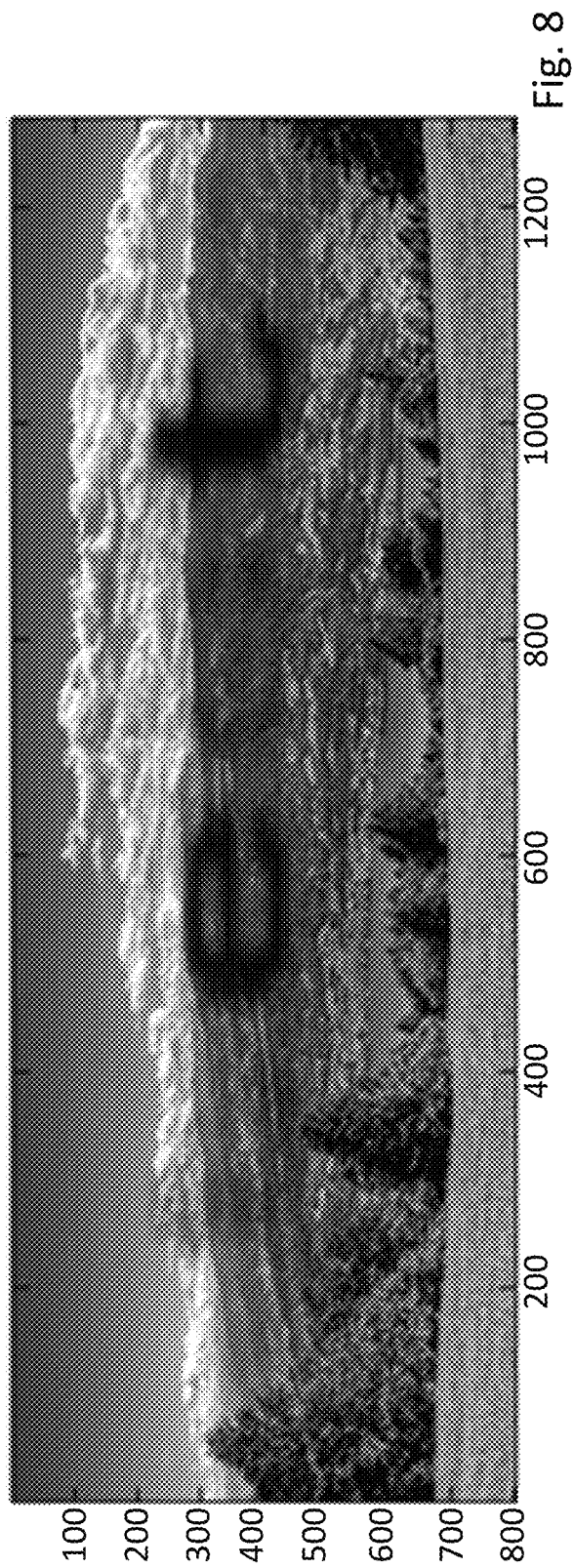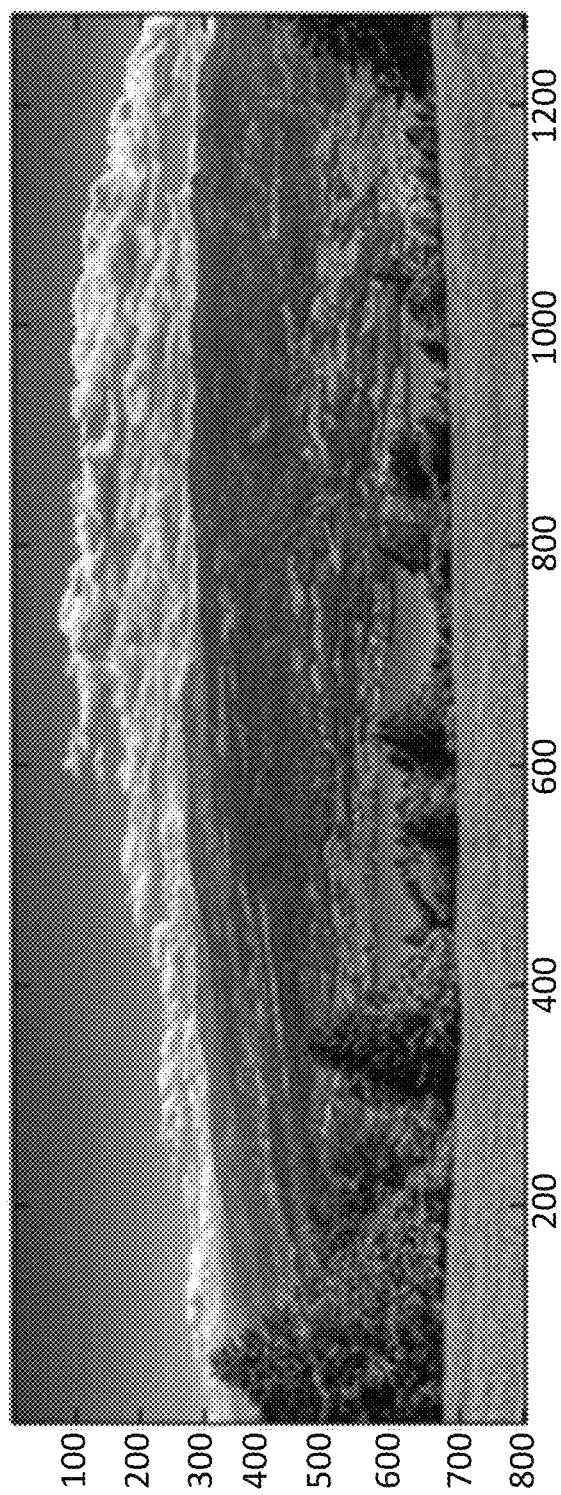

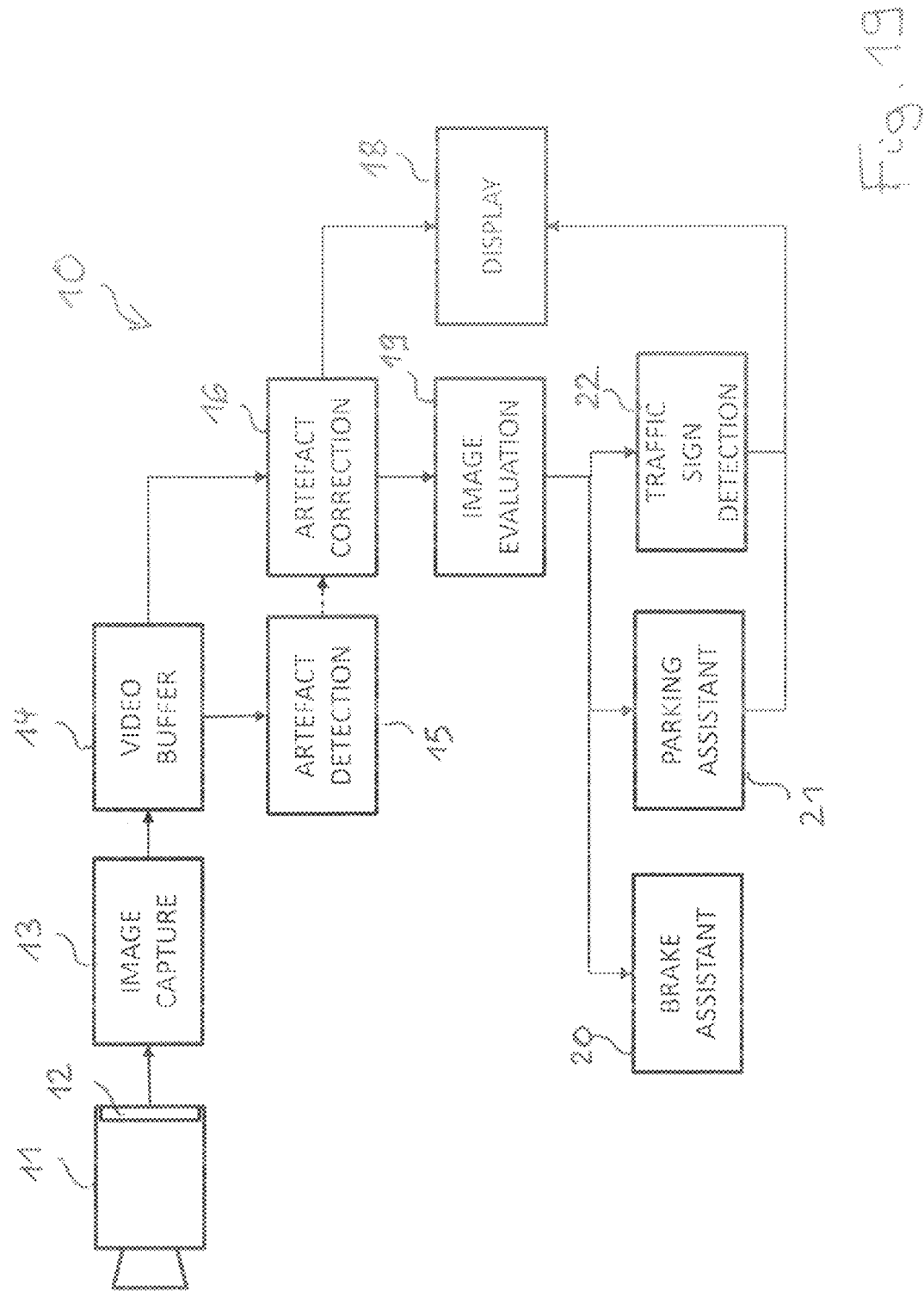

STATIC SOILING DETECTION AND CORRECTION

CROSS REFERENCE TO RELATED APPLICATION

This application claims the benefit of International application No. PCT/EP2016/060379, filed May 10, 2016, which claims priority to German patent application No. 15174934.8 filed Jul. 2, 2015, each of which is hereby incorporated by reference.

TECHNICAL FIELD

The technical field relates generally to a method for detecting image artifacts.

BACKGROUND

Present day passenger vehicles are increasingly equipped with camera-based assistance systems, which capture the surrounding environment of the vehicle, and provide a variety of functions for improving driving safety and comfort. The functionality of these systems is based on the analysis of the recorded image data. Therefore, the quality of the system's predictions is directly related to the quality of the image data.

One factor that affects the image quality and which is difficult to control is the degree of contamination of the optical system of the camera. The cameras may be positioned at places with less risk of contamination, or the cameras may be cleaned by an electric wiper. Despite of these provisions, it is impossible to avoid a contamination of the optical system completely. Therefore, it has been proposed to detect dirt particles on a camera lens automatically in order to trigger an appropriate action. An example for such an automatic detection of lens contaminations is disclosed in the European patent application EP 2351351.

SUMMARY

In a first aspect, the present specification discloses a computer implemented method for detecting image artifacts. Image data with image frames is received from a vehicle camera, for example over an automotive data bus, and an intensity difference between neighboring pixels in a first direction of an image frame is compared with a pre-determined upper threshold and with a pre-determined lower threshold.

The first direction may correspond to the rows of an image frame. Furthermore, the pixel transition values can also be computed in a second direction, or y-direction, with respect to the pixel locations of the image frame. Thereby, the overall detection quality can be improved and stripe shaped artifacts can be avoided. The second direction may correspond to the columns of an image frame.

A pixel transition value is set to a first value when the previously computed intensity difference of neighboring pixels is greater than the pre-determined upper threshold. The pixel transition value is set to a second value when the intensity difference is less than the pre-determined lower threshold and the pixel transition value is set to zero when the intensity difference lies between the pre-determined upper threshold and the pre-determined lower threshold.

In particular, the upper threshold can be set to a positive value and the lower threshold to a negative value, and the positive and the negative value can have equal magnitude.

The upper threshold and the lower threshold may also be equal and, in particular, they may both be equal to zero. The first value can be chosen as a positive value, such as 1 or a positive constant a, and the second value can be chosen as a negative value, such as −1 or as the negative of the first value.

If the intensity difference is exactly equal to one of the thresholds it may be set to the respective first or second value or it may be set to zero. The pixel transition value is also referred to as "transition type".

Accumulated pixel transition values are computed from the pixel transition values of corresponding pixel locations of the image frames by applying a low pass filter with respect to time, wherein time is represented by the frame index. In one embodiment, the low pass filter is computed as an accumulated value at a frame index f for the respective first and second direction. The accumulated value is computed as a weighted sum of the accumulated value at the earlier frame index f−1 and the pixel transition value at the earlier frame index f. In particular, the weight factor of the accumulated value at the earlier frame index f−1 may be set to at least 0.95. Thereby, a major contribution comes from the previous estimation, which results in a low pass filter.

Furthermore, the accumulated pixel transition values are smoothed out with respect to the pixel locations by applying a spatial filter to the pixel locations, in particular by computing a convolution of the spatial filter. In particular, the spatial filter can be provided as filter with filter coefficients between 0 and 1 that fall off to zero as a function of a difference from a central point, for example by a circular filter.

In one embodiment, the low pass filtering with respect to time is performed before the spatial filtering. In another embodiment, spatial filtering is performed before the low pass filter with respect to time. In the first case, the low pass filter is applied to the pixel transition values to obtain accumulated pixel transition values and the spatial filter is applied to the accumulated pixel transition values. In the second case, the spatial filter is applied to the pixel transition values to obtain smoothed pixel transition values and the low pass filter with respect to time is applied to the smoothed pixel transition values.

The pixel transition values that have been accumulated with respect to time and smoothed with respect to the pixel locations (x, y) are referred as "smoothed and accumulated pixel transition values". This expression refers to both sequences of filtering.

In one embodiment, the spatial filter is realized as an averaging filter, for which the filter coefficients add up to 1. This is equivalent to a total volume of 1 under the filter function if the filter is defined step-wise and the coordinates (x, y) have a distance of 1.

Magnitude values of the pixel locations are computed for the smoothed pixel transition values of the pixel locations. If the smoothed pixel transition values are computed with respect to one direction only, the magnitude values can be computed by taking the modulus.

If the smoothed pixel transition values are computed with respect to the first direction and with respect to the second direction, a magnitude value can be computed by adding the squared values for the respective first and second directions, and in particular, it can be computed as an L2-norm, which is also referred to as Euclidean norm. Then, the pixels of potential artifact regions are identified by comparing the magnitude value for given pixel locations (x, y) with a predetermined detection threshold.

In a further aspect, the present specification discloses a computer implemented method for correcting image artifacts. According to this method, image data with image frames is received from a vehicle camera, for example via an automotive data bus.

Pixel quotient values for the respective pixel locations are computed in a first direction, or x-direction. In particular, the first direction can be provided by the rows of an image frame. In order to improve the image correction and to avoid stripe shaped artifacts, pixel quotient values for the respective pixel locations can also be computed in a second direction, or y-direction. In particular, the second direction can be provided by the columns of an image frame.

A numerator of the pixel quotient value comprises an image intensity at a given pixel location and a denominator of the pixel quotient value comprises an image intensity at a neighboring pixel in the respective first or second direction. By using pixels neighboring positions, the method is "localized", and does not combine pixels from pixel locations, which are far apart. This feature contributes to a sparse matrix for a system of linear equations.

Median values of the pixel quotient values are computed for the respective pixel locations with respect to time, wherein time is represented by frame index. In particular, the median value can be computed as a streaming median value, which approximates a true median.

The attenuation factors of the pixel locations of the image frames are computed as an approximate solution to a system of linear equations in the attenuation factors of the respective pixel locations (x, y), wherein the attenuation factors of the pixel locations are represented as a vector.

The system of linear equations comprises a first set of linear equations, in which the previously determined median values appear as pre-factor of the respective attenuation factors. Furthermore, the system of linear equations comprises a second set of linear equations, which determine values of the attenuation factors at corresponding pixel locations. In particular, the second set of linear equations may be determined by the abovementioned method for identifying image artifacts.

A corrected pixel intensity for a pixel of the image frame at a given time t is derived by dividing the observed pixel intensity by the previously determined attenuation factor B(x, y), where the attenuation factor lies between 0 and 1.

In a particular embodiment, the median values of the pixel quotient values are obtained as streaming median values of the pixel quotient values up to a frame index f. The streaming median value is derived from a median value estimate for the previous frame index f−1 and the pixel quotient value at frame index f.

The streaming median value approximates the true value of a median. The streaming median value of the current frame index and pixel is computed by adding a pre-determined value "delta" to the previous estimate if the current pixel quotient value is greater than the previous streaming median value. If the current pixel quotient value is less than the previous streaming median value, the pre-determined value "delta" is subtracted from the previous streaming median value. Otherwise, the current streaming median value is set to the previous streaming median value.

In particular, the abovementioned system of linear equation can be solved approximately using an iterative method. A number of iteration steps may be determined in advance or in dependence of a convergence rate.

The pre-factors of the attenuation factor in the linear equations can be defined as elements of a constraint matrix. In one embodiment, the method comprises multiplying the system of linear equations with the transposed constraint matrix. The resulting system of linear equations is solved using an iterative method. In particular, the iterative method can be provided by a conjugate gradient method, which is used for finding the minimum of a quadratic form that is defined by the resulting equation.

According to a further aspect, the present specification discloses a computation unit for carrying out the abovementioned method of detecting image artifacts, for example by providing integrated circuits, ASICS, microprocessors computer readable memory with data and computer readable instructions and the like.

The computation unit comprises an input connection for receiving image data and an output connection for outputting locations of detected pixels. For a bidirectional data connection, the output and input connections may also coincide. The locations of detected pixels can also be marked in a memory area, for example by providing pointers to data structures etc.

The computation unit is operative to execute the abovementioned artifact detection method, in particular, the computation unit is operative to compare intensity differences between neighboring pixels in a first direction with a pre-determined upper threshold and with a pre-determined lower threshold and to set a pixel transition value according to the intensity difference.

The computation unit sets the pixel transition value to a first value when the intensity difference is greater than the pre-determined upper threshold, to a second value when the intensity difference is less than the pre-determined lower threshold and sets the pixel transition value to zero when the intensity difference lies between the pre-determined upper threshold and the pre-determined lower threshold.

Furthermore, the computation unit computes accumulated pixel transition values of the respective pixel transition values by applying a low pass filter with respect to a frame index or with respect to time. The computation unit computes smoothed pixel transition values by applying a spatial filter to the accumulated pixel transition values and computes a magnitude value of the smoothed pixel transition values for the pixel locations of the image frame.

The computation unit outputs the detected pixels via the output connection, for example by storing a reference to pixel locations or the coordinates of the pixel locations of the detected artifacts in a computer readable memory of the computation unit.

Then, the computation unit identifies pixels of potential artifact regions by comparing the magnitude value with a predetermined detection threshold.

Moreover, the present specification discloses a vehicle camera with the aforementioned computation unit, wherein the vehicle camera is connected to the input connection of the computation unit.

In a further aspect, the present specification discloses a computation unit for correcting image artifacts. The computation unit comprises an input connection for receiving image data and an output connection for outputting corrected image frames, which may also coincide for a bidirectional data connection.

The computation unit is operative to execute the abovementioned method for correcting image artifacts. In particular, the computation unit is operative to compute pixel quotient values in a first direction, wherein the pixel quotient values are derived from a quotient. The numerator of the quotient comprising an image intensity at a given pixel location and the denominator comprising an image intensity at a neighboring pixel in the first direction.

Furthermore, the computation unit computes median values of the pixel quotient values with respect to time and computes attenuation factors of the respective pixel locations of the image frame. The attenuation factors are computed as an approximate solution to a system of linear equations in the attenuation factor, the system of linear equations comprising a first set of linear equations and a second set of linear equations.

The equations of the first set of equations relate the value of an attenuation factor at a first pixel location to the value of an attenuation factor at an adjacent or neighboring pixel location in the respective first or second direction.

In the first set of linear equations, the median values appear as pre-factor of the attenuation factors.

The second set of linear equations determines values of the attenuation factors at respective pixel locations, which are known by other means, for example by using the abovementioned artifact detection method.

Then, the computation unit derives corrected pixel intensities by dividing the observed pixel intensities, or, in other words, the pixel intensities in the received current image frame, by the corresponding attenuation factors $B(x, y)$ of the respective pixel locations.

Furthermore, the present specification discloses a vehicle camera with the computation unit for correcting the image artifacts, wherein the vehicle camera is connected to the input connection of the computation unit.

BRIEF DESCRIPTION OF THE DRAWINGS

The subject matter of the present specification is now explained in further detail with respect to the following Figures in which

FIG. 8 shows an image with an overlaid synthetic blur mask;

FIG. 9 shows a corrected image, which is derived from the image of FIG. 8;

FIG. 19 shows an image defect correction system according to the present specification.

DETAILED DESCRIPTION

In the following description, details are provided to describe the embodiments of the present specification. It shall be apparent to one skilled in the art, however, that the embodiments may be practised without such details.

Figure 1:
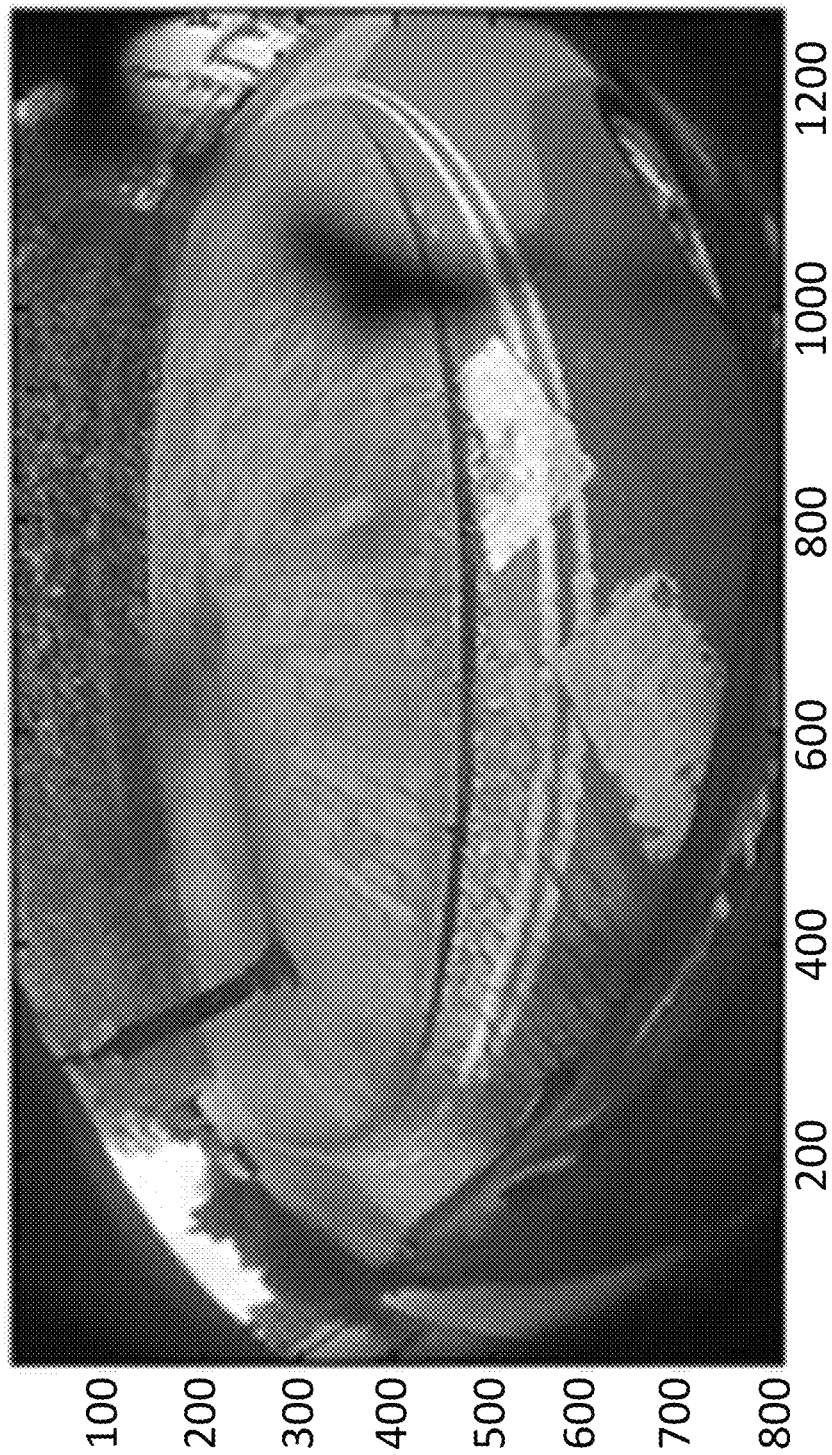
FIG. 1 shows an image of a vehicle camera that contains image contaminations.

A common assumption in imaging systems is that the radiance emitted from a scene is observed directly at the sensor. However, there are often physical layers or media lying between the scene and the imaging system. For example, the lenses of vehicle cameras, consumer digital cameras, or the front windows of security cameras often accumulate various types of contaminants over time such as fingerprints, dust and dirt. Also, the exposure of cameras to aggressive environments can cause defects in the optical path, like stone chips, rifts or scratches at the camera lens. Artifacts from a dirty camera lens are shown in FIG. 1.

These artifacts can be disturbing for users and can seriously impair the analysis of the scene by automatic methods. For example, in the automotive area, the wrong analysis of a scene may lead to the turning off or malfunction of security system when they are needed in case of an accident, to false alarms, or to unwanted action from the vehicle like an erroneous automatic break action. These artifacts can cause potentially life-threatening situations.

One possible prevention measure against dirty lenses is to clean them at pre-determined times. However, because many camera systems are automated and are not often inspected, such as many automotive systems, an automatic way of detecting such artifacts is needed. Similarly, an automatic way of detecting lens damage that cause image artifacts is needed. A method that detects that there are issues on the lens can notify a human that it needs attention or it can disable or notify the methods that follow it that that particular part of the image is not usable.

In cases where it is not practical or commercially viable to clean or change the camera, such as for applications like outdoor security cameras, underwater cameras or automotive cameras or for videos captured in the past, a computational algorithm according to the present specification may provide advantages by artificially removing the artifacts caused by dirt or by a lightly damaged-lens, so that the methods analyzing the images can operate properly.

Unlike image inpainting and hole-filling methods, an algorithm according to the present specification makes use of a computational model for the process of image formation to detect that the lens are dirty or directly recover the image information, in particular those image points which are still partially visible in the captured images.

Artifacts caused by dirt and lens damage as well as artifacts caused by obstructions can be described using an image formation model in which the scene radiance is reduced, either by attenuation, in the case of lens dirt or light lens damage, or, in the case of occluders, by obstruction. In general, attenuation tends to make the affected regions darker. Because of camera defocus, this attenuation is smooth-varying and the high frequencies in the original scene radiance are partially preserved in the degraded images.

This can be seen in FIG. 1, where the edges of the background are still partially visible on the degraded image.

The current specification discloses two types of image correction methods, which make use of these observations. According to a first type of method a method a location where the lens contains attenuation or occluding-type artifacts is detected. According to a second type of method, the amount by which the images are attenuated at each pixel is detected and an estimate of the artifact-free image is obtained. The methods use only the information measured from a sequence of images, which is obtained in an automated way. They make use of temporal information but require only a small number of frames to achieve a solution. The methods according to the present specification do not require that the images are totally uncorrelated, but only that there is some movement, as the one expected in, for example, a moving vehicle. The methods work best when the statistics of the images being captured obeys a natural image statistics.

There are few methods on the literature that deal with this issue. The method SIGGRAPH according to the reference "Removing Image Artifacts Due to Dirty Camera Lenses and Thin Occluders", by J. Gu, R. Ramamoorthi, P. N. Belhumeur and S. K. Nayar, in ACM Transactions on Graphics (Proceedings of SIGGRAPH Asia), December 2009, attempts to detect and correct the artifacts in image sequences but requires that the output of computing the mean image and mean image derivative magnitude over time are mostly constant valued image-sized arrays except where artifacts are located (see FIG. 6 b) and c) of the aforementioned paper.

This means that these quantities are only usable after a very large amount of frames, i.e., a long time, and that the scenes have to be very diverse and uncorrelated. While the first condition imposes a long detection time, the latter one is typically not applicable at all, since the scenes in most real-life scenarios have always about the same type of content, e.g., a road below and sky above for automotive applications. The authors themselves recognize that lighting is typically unevenly distributed and propose a solution with inferior quality.

Image inpainting and hole-filling techniques assume that the location of the artifacts are known and then replace the affected areas with a synthesized estimate obtained from the neighboring regions. By contrast, a correction method according to the present specification makes use of information of the original scene that is still partially accessible to recover the original scene. In many cases, the result is more faithful to the actual structure of the original unobserved image. In areas where the image is totally obstructed, inpainting methods can be used.

The reference "Removal of Image Artifacts Due to Sensor Dust" by C. Zhou and S. Lin, Association for Computing Machinery, Inc., June 2007 describes reducing the appearance of dust in an image by first formulating a model of artifact formation due to sensor dust and then using contextual information in the image and a color consistency constraint. This method has a very narrow application range, i.e., the detection of dust particles, and minimizes a non-convex function, which may be computationally intensive and instable.

Finally, some methods detect areas in the image that rarely contain high frequencies. Although drops of water on the lens and obstructing dirt has this effect, attenuating artifacts exhibit a transparency-type effect that lets a lot of high frequencies from the scene go through. This means that such areas would not be detected.

FIGS. 1 to 7 illustrate a method for detecting image attenuations according to a first embodiment of the present specification. FIGS. 8 to 18 illustrate a method for correcting image contaminations according to a second embodiment of the present specification.

In the FIGS. 1 to 18, the pixel numbers in the x-direction are indicated on the x-axis and the pixel numbers in y-direction are indicated on the y-axis. The image format of the image in FIGS. 1 to 18 is about 1280×800 pixels.

According to a first embodiment, a detection method is disclosed, which is suitable for detecting if there is a disturbance in the optical path caused by attenuating or obstructing elements. The model for describing attenuating or obstructing elements is:

$$I_f = I_{of} B, \quad (1)$$

where $I_f$ is the observed image with artifacts, the index 'f', which is also referred to as time index "t", is a frame index that numbers the image frames in the order of their recording, $I_{of}$ is the original unobserved image and $B \in [0,1]$ is the attenuation mask, where 0 indicates total obstruction and 1, no obstruction. The intensity "I" refers to luminance values, but similar processing can be done in RGB or in other color spaces. Computing the horizontal derivative of the previous equation leads to $$I_f(x+1,y) - I_f(x,y) = I_{of}(x+1,y)B(x+1,y) - I_{of}(x,y)B(x,y), \quad (2)$$

wherein x and y are respective horizontal and vertical pixel indices and the pixels are number consecutively in the vertical and the horizontal directions.

In cases where there is no change in the attenuation mask, i.e., $B(x+1, y) \equiv B(x, y)$, this equation becomes $$I_f(x+1,y) - I_f(x,y) = B(x,y)(I_{of}(x+1,y) - I_{of}(x,y)). \quad (3)$$

According to natural image statistics, pixel intensities vary very little between consecutive pixels in most of the image, with very few exceptions. This is the principle behind JPEG compression, which works by not transmitting the high-frequency components of the image, i.e., the variations, for most of the image. Equivalently, many ill-posed problems such as image restoration or other recovery methods impose that the lasso, also known as "least absolute shrinkage and selection operator", or the $L_1$-norm of the image derivatives is minimized, which translates the observation that most derivative values have about zero magnitude and only a few exceptions occur.

Considering that each pixel intensity value $I_0(x, y)$ is given by the addition of an idealized value and noise following a Normal distribution $\mathcal{N}(0, \sigma^2)$ with zero mean and some variance, a typical model, the smooth variation of natural images can be represented as $$I_{of}(x+1,y) - I_{of}(x, y) \sim \mathcal{N}(0, \sigma^2), \quad (4)$$

which implies that $$I_f(x+1,y) - I_f(x,y) \sim \mathcal{N}(0, B(x,y)^2 \sigma^2), \quad (5)$$

meaning, among other things, that the derivatives of $I_f(x, y)$ have about the same amount of positive and negative values.

These considerations are used to detect that a variation exists in B at a particular location and direction of the image, by counting the average amount of positive minus negative transitions that occur. If there is a predominance of positive or negative transitions by, say, 20%, there is a variation in the value of B and, therefore, attenuation. This is done by first computing the transition type, $$S_{fx}(x, y) = \begin{cases} 1 & \text{if } I_f(x+1, y) - I_f(x, y) > T \\ -1 & \text{if } I_f(x+1, y) - I_f(x, y) < -T \\ 0 & \text{otherwise} \end{cases} \quad (6)$$

where T is a threshold. A threshold T=0 is used in the experimental analysis to obtain the FIGS. 2 and 3. The corrected FIGS. 9 and 15, the time averaged transition magnitudes of FIGS. 6 and 7 and the estimated blur masks of 13 and 18 have been obtained with a moving camera and after applying the method for a few frames.

Then, an Infinite Impulse Response (IIR) filter in time is used to accumulate the transitions, $$S_x^f(x,y) = \alpha S_x^{f-1}(x,y) + (1-\alpha) S_{fx}(x,y) \quad (7)$$

where the superscript f and the subscript f indicate a frame number and $\alpha$ is the feedback filter coefficient of the IIR filter. $S_x^f(x, y)$ may be initialized with 0.

One way of determining $\alpha$ as a function of a number of frames F is given by determining a value of $\alpha$ that makes a positive detection achieve a value of 0.95 after filtering with F frames, which can be shown to be given by the expression $$\alpha = 10^{\frac{\log_{10}(1-0.95)-1}{F}}. \quad (8)$$

Using about F=600 frames for update time, which is equivalent to about 20 seconds, a value of $\alpha$=0.99 is reached, which is used in the experimental analysis.

$S_y^f(x, y)$ is computed in an analogous way as $S_x^f(x, y)$:

$$S_{fy}(x, y) = \begin{cases} 1 & \text{if } I_f(x, y+1) - I_f(x, y) > T \\ -1 & \text{if } I_f(x, y+1) - I_f(x, y) < -T \\ 0 & \text{otherwise} \end{cases}$$

and $$S_y^f(x, y) = \alpha S_y^{f-1}(x, y) + (1-\alpha) S_{fy}(x, y).$$

Figure 2:
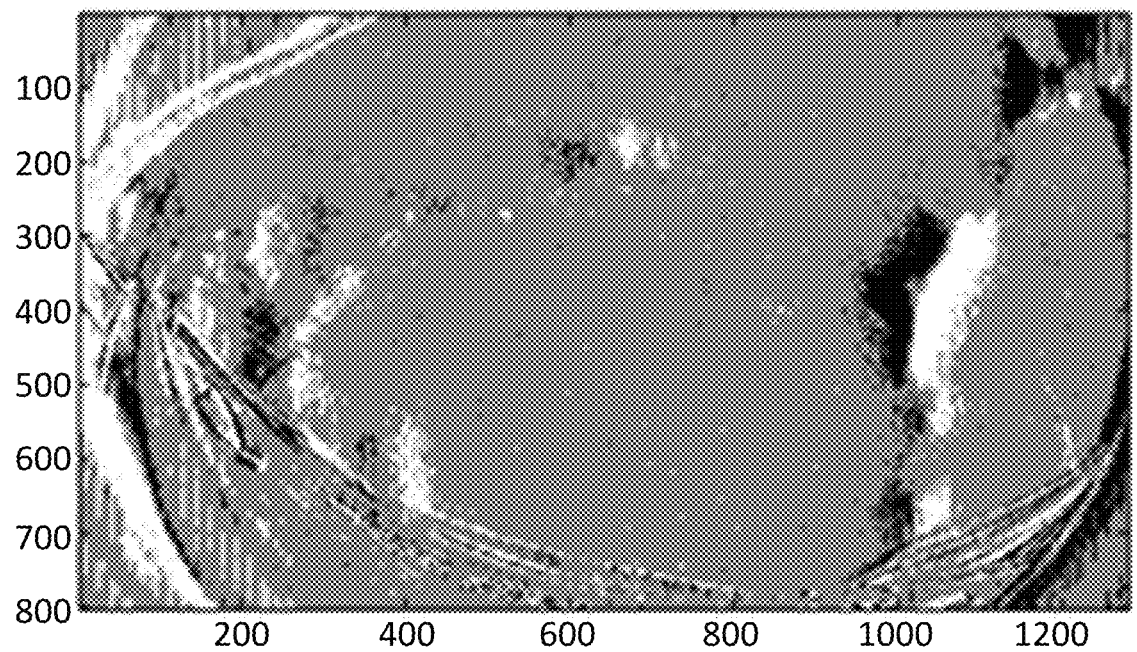
FIG. 2 shows a pixel variation measure of the image of FIG. 1 in the x direction.
Figure 3:
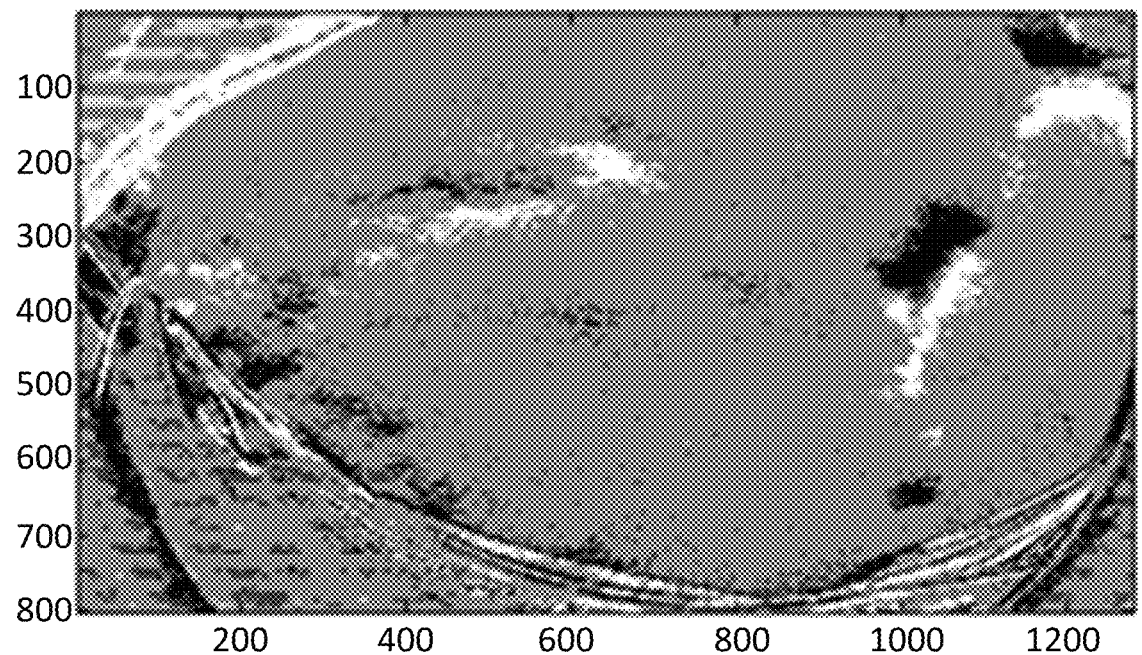
FIG. 3 shows a pixel variation measure of the image of FIG. 1 in the y direction.

The results of computing the arrays $S_x^f(x, y)$ and $S_y^f(x, y)$ for the image of FIG. 1, are shown in FIGS. 2 and 3, respectively. In FIGS. 2 and 3, a black color signifies a negative transition, a white color signifies a positive transition and a grey color signifies no transition.

In the particular application of detecting attenuations caused by dirty lenses, the attenuation is out of focus. This means that B varies smoothly and a transition at a particular pixel should be accompanied by similarly signed transitions at pixels nearby.

Figure 4:
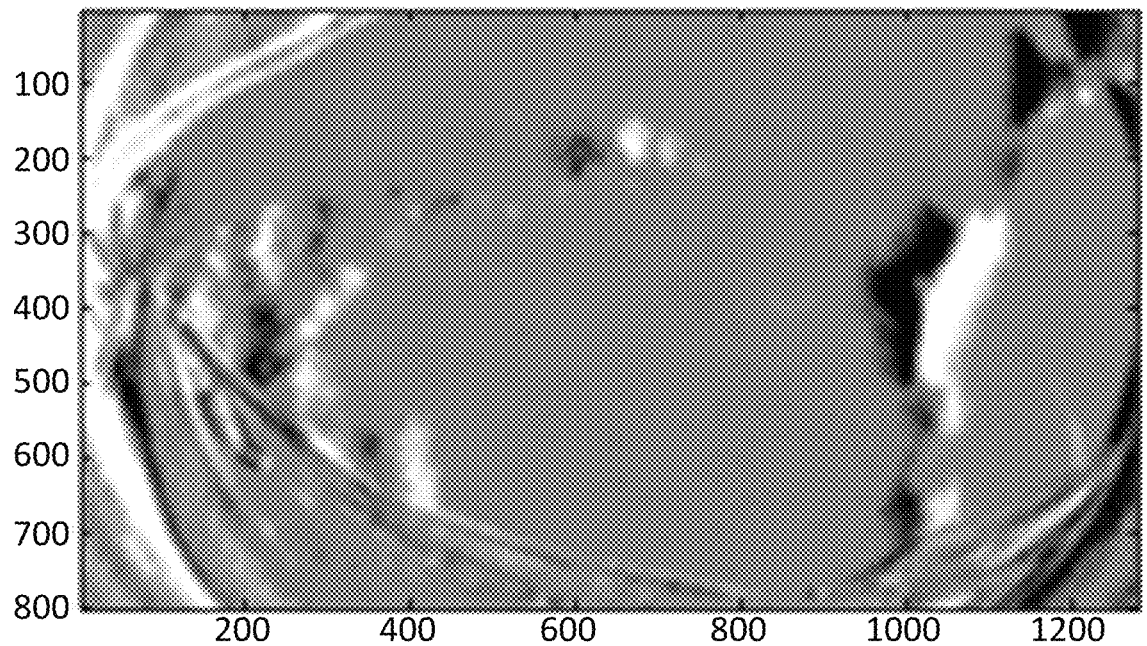
FIG. 4 shows the result of smoothing out the image of FIG. 2 by convolution with a circular filter.
Figure 5:
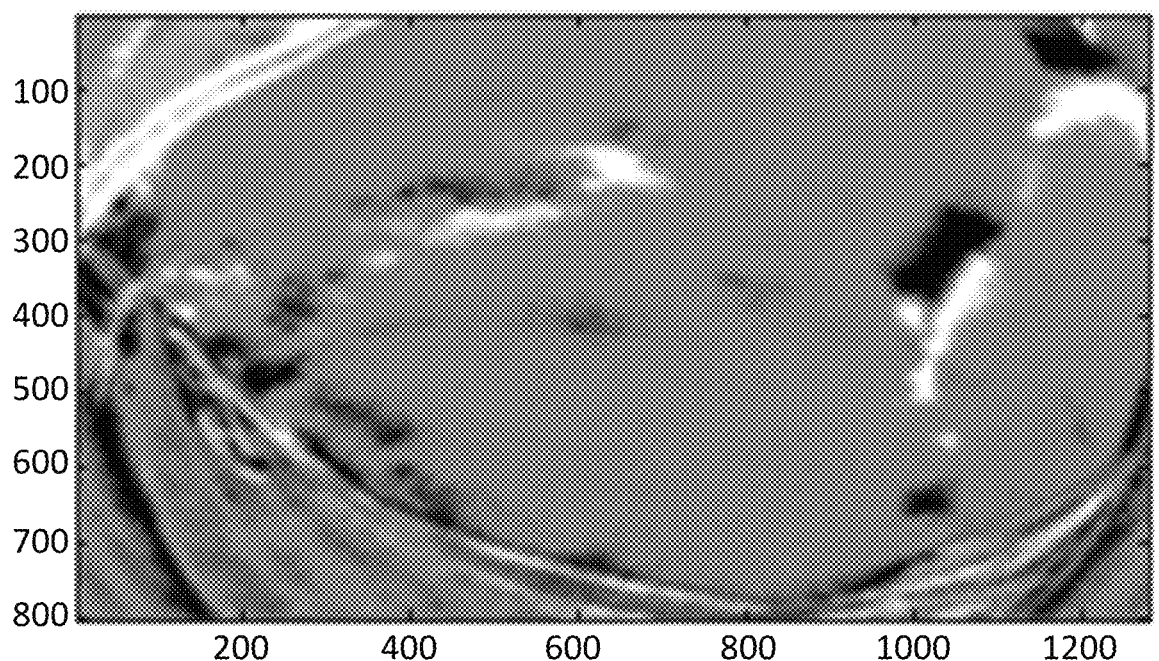
FIG. 5 shows the result of smoothing out the image of FIG. 3 by convolution with a circular filter.

To constrain the method so that it only finds smooth-varied attenuation maps, $S_x^t(x, y)$ and $S_y^t(x, y)$ are blurred with a circular filter K whose coefficients add up to 1, $S_x^t(x, y) \leftarrow S_x^t(x, y)*K$ and $S_y^t(x, y) \leftarrow S_y^t(x, y)*K$, wherein * denotes the convolution, and the expressions left of the arrows refer to the results of the convolution. The intensity values of the resulting smoothed out arrays $S_x^t(x, y)$ and $S_y^t(x, y)$ are illustrated in FIGS. 4 and 5, respectively, if the original image is given by FIG. 1. Isolated black and white pixels and stripe shaped artifacts, which are still present in FIGS. 2 and 3, are suppressed or eliminated in FIGS. 4 and 5, and the light and dark regions are more contiguous and have smoother boundaries.

Herein, a "circular filter" refers to a filter that is circularly symmetric with respect to the spatial dimensions x and y. A symmetric multivariate Gaussian filter or a Mexican-hat shaped filter are examples for circular filters. Naturally, any filter shape and type can be used, depending on image resolution and camera and filter properties.

Figure 6:
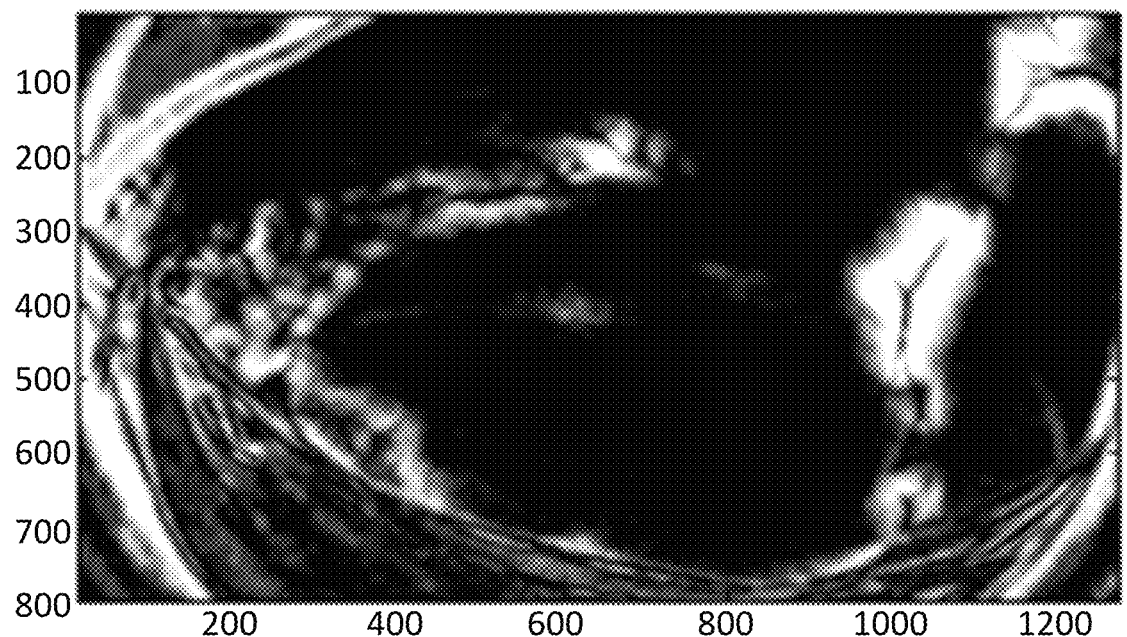
FIG. 6 shows an overall pixel variation measure that is computed from the arrays of FIGS. 4 and 5.

Then the overall magnitude $S_f(x, y)$ of a transition at the pixel location (x, y) is computed as the Euclidean norm of the individual magnitudes for the x- and y-directions:

$$S_f(x,y) = \sqrt{S_{fx}(x,y)^2 S_{fy}(x,y)^2}. \quad (9)$$

and a transition exists if $s_f(x, y) \geq T_2$. In the experimental analysis of FIG. 7, a threshold $T_2$=0.2 is used. The computation of the sign, the addition for many pixels (in this case) and a threshold is denoted in the robust statistics literature as the sign test. FIG. 6 shows the intensities of the array $S_f(x, y)$, and FIG. 7 shows the thresholded array $S_f(x, y)$, when the recorded image is provided by FIG. 1.

Figure 7:
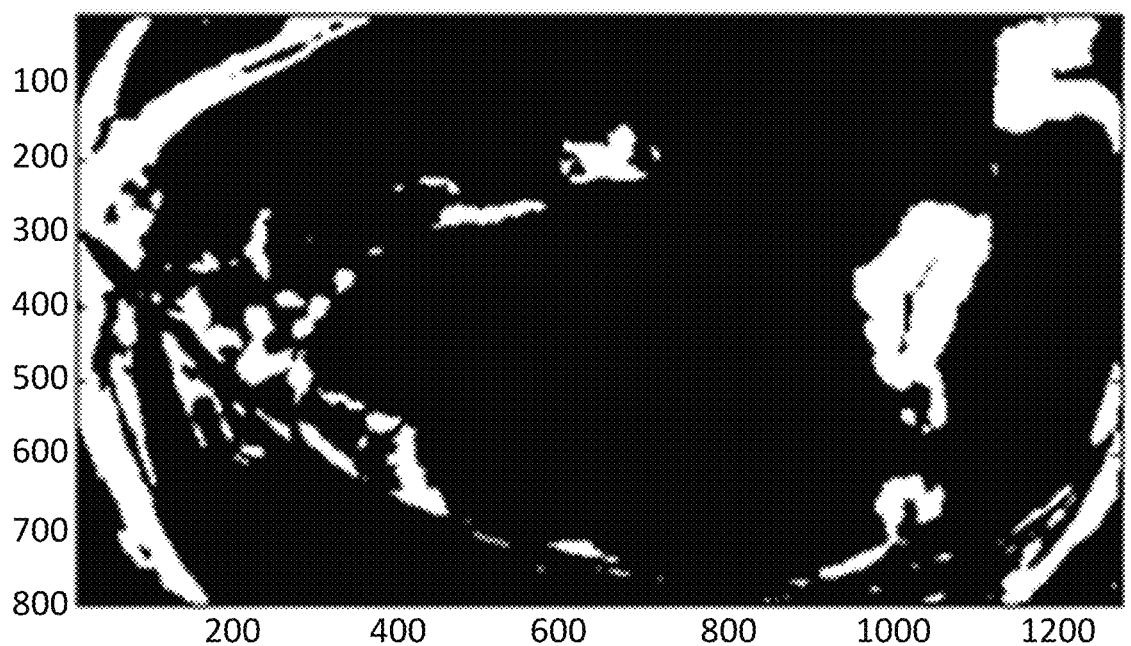
FIG. 7 shows the result of thresholding the overall pixel variation measure of FIG. 6.

FIG. 7 shows that the algorithm detects dirt regions but also other time independent features with strongly varying intensities such as the lens border and the border of the car from which the image is taken. Features like the car border and the lens border are always present in the image and can be identified and masked out easily. Conversely, the thresholding according to FIG. 7 can also be used to identify image portions which are not affected by dirt, scratches and the like.

Second Embodiment: Correcting the Attenuation

Figure 10:
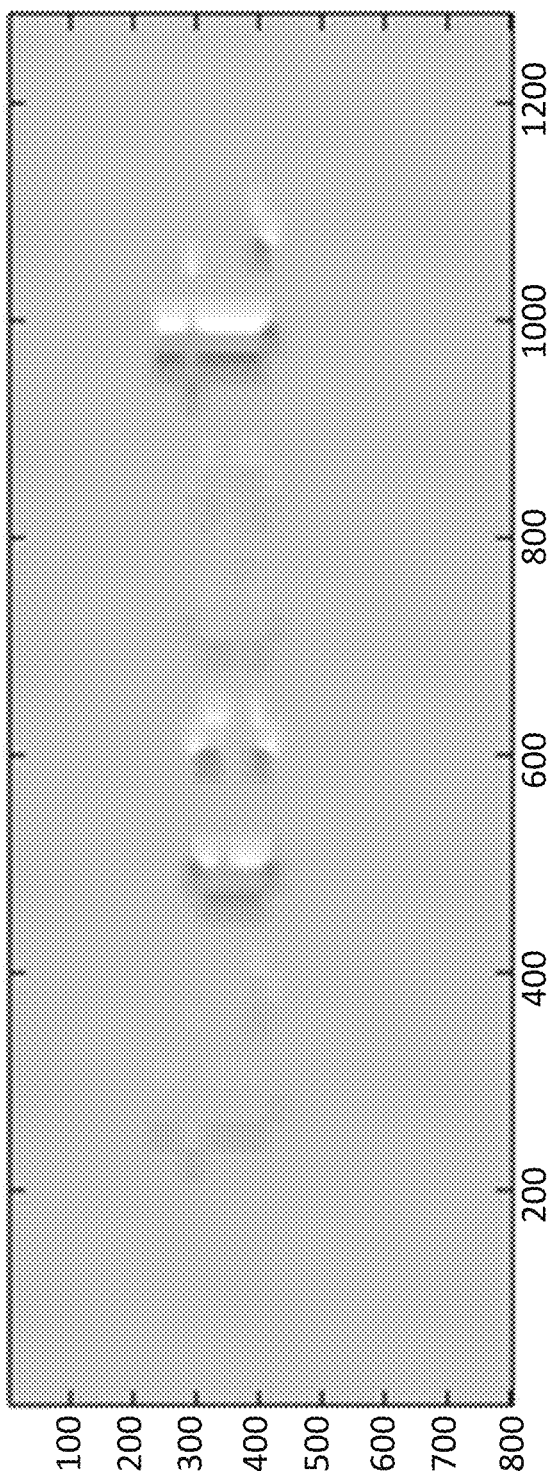
FIG. 10 shows a pixel variation measure in the x-direction of FIG. 8.
Figure 11:
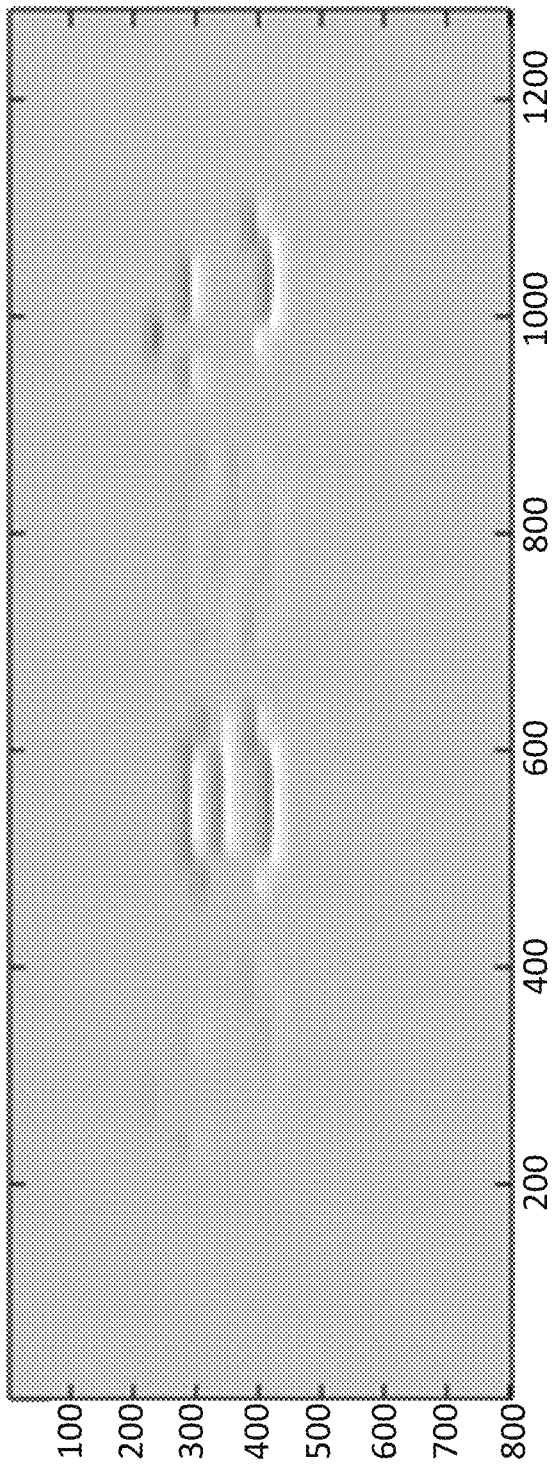
FIG. 11 shows a pixel variation measure in the y-direction of FIG. 8.

According to a second embodiment of the present specification, a method is disclosed for determining an amount of attenuation and for obtaining an estimate of the artifact-free image based on the determined amount of attenuation. This embodiment is illustrated in the FIGS. 8-18. FIG. 8 shows an image with an overlaid artificial contamination with a blur mask that comprises the letters "t e s t". FIG. 9 shows a recovered image, which is derived from the image of FIG. 8 according to the below mentioned image recovery algorithm. FIG. 10 shows a pixel variation measure $\xi_x$ in the x-direction of FIG. 8 and FIG. 11 shows a pixel variation measure $\xi_y$ in the y-direction of FIG. 8. The computation of the pixel variation measure is explained further below.

Figure 12:
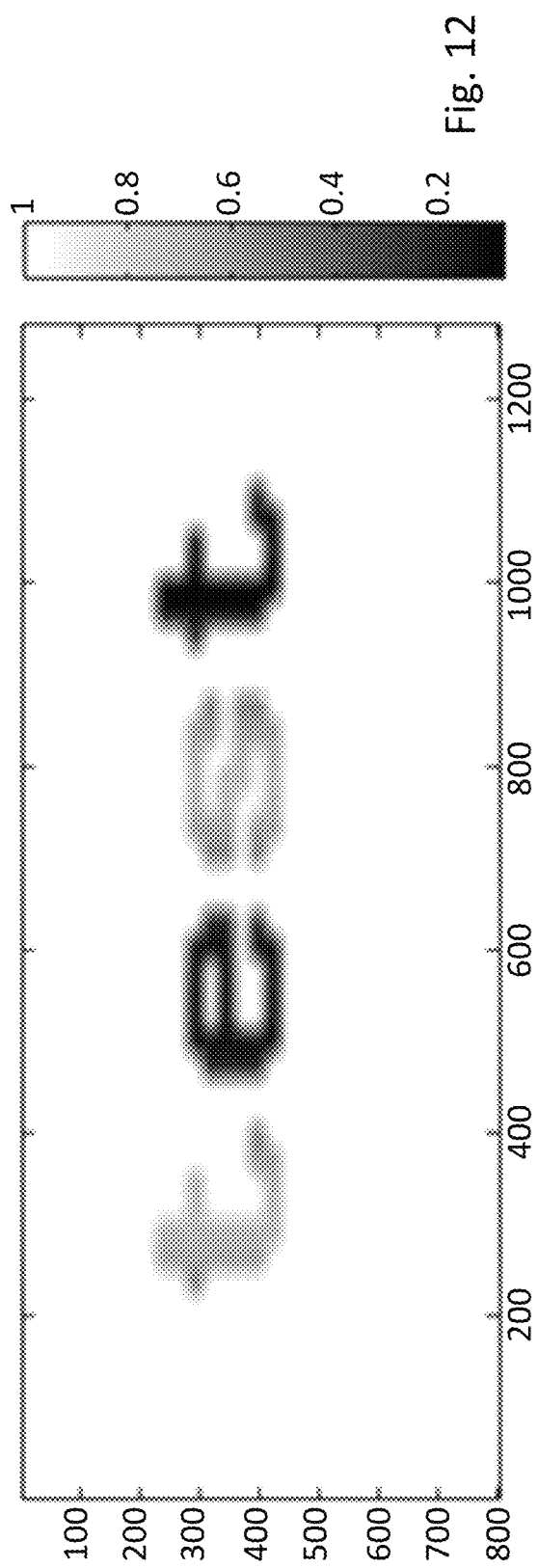
FIG. 12 shows the synthetic blur mask.
Figure 13:
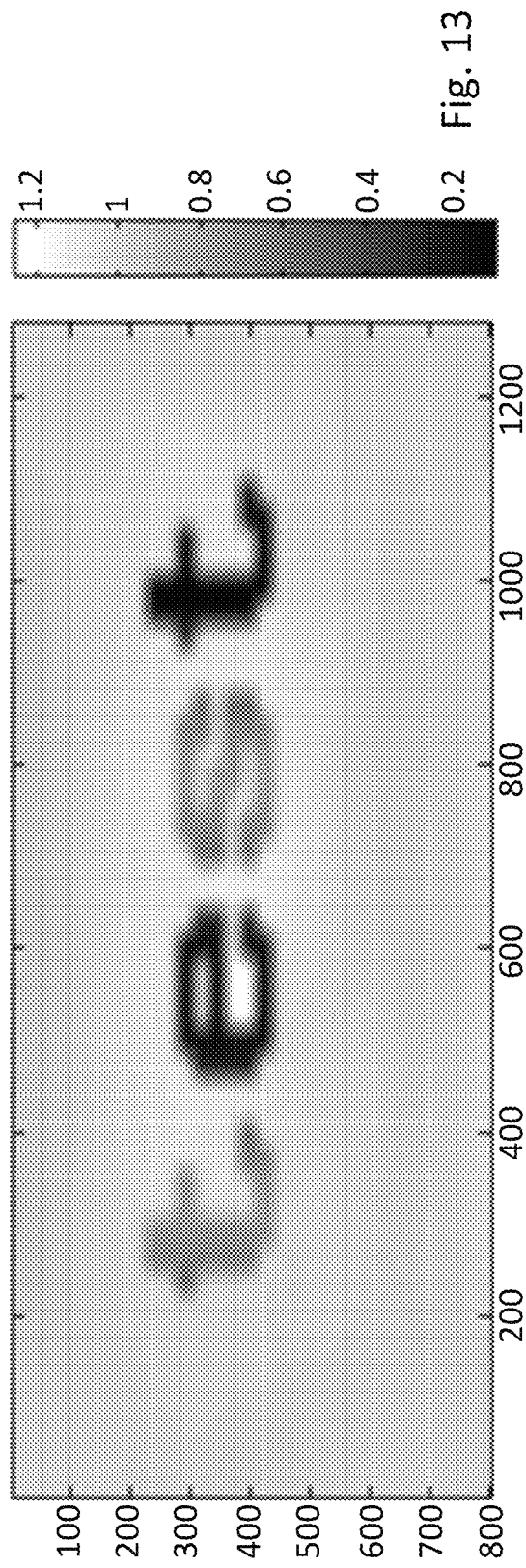
FIG. 13 shows the estimated blur mask.

FIG. 12 shows the actual blur mask and FIG. 13 shows the estimated blur mask, which is obtained by solving the below mentioned equation (19). The final result of FIG. 9 is obtained by solving the below mentioned equation (21).

Figure 14:
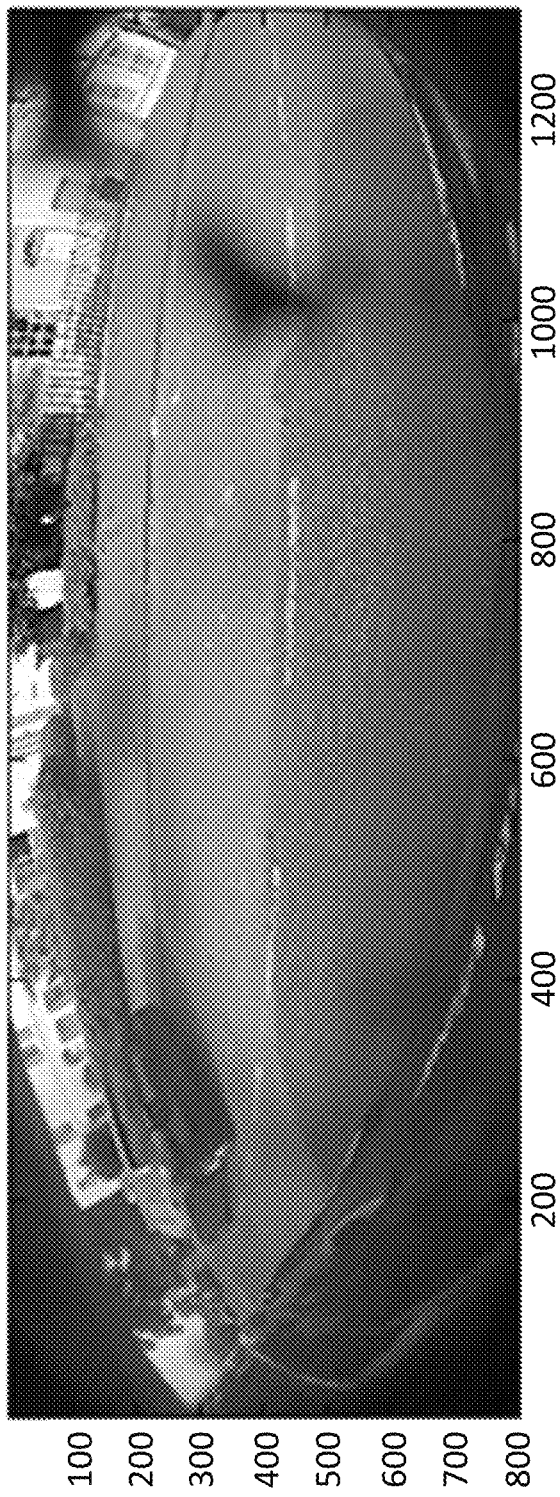
FIG. 14 shows an original image with artifacts.
Figure 15:
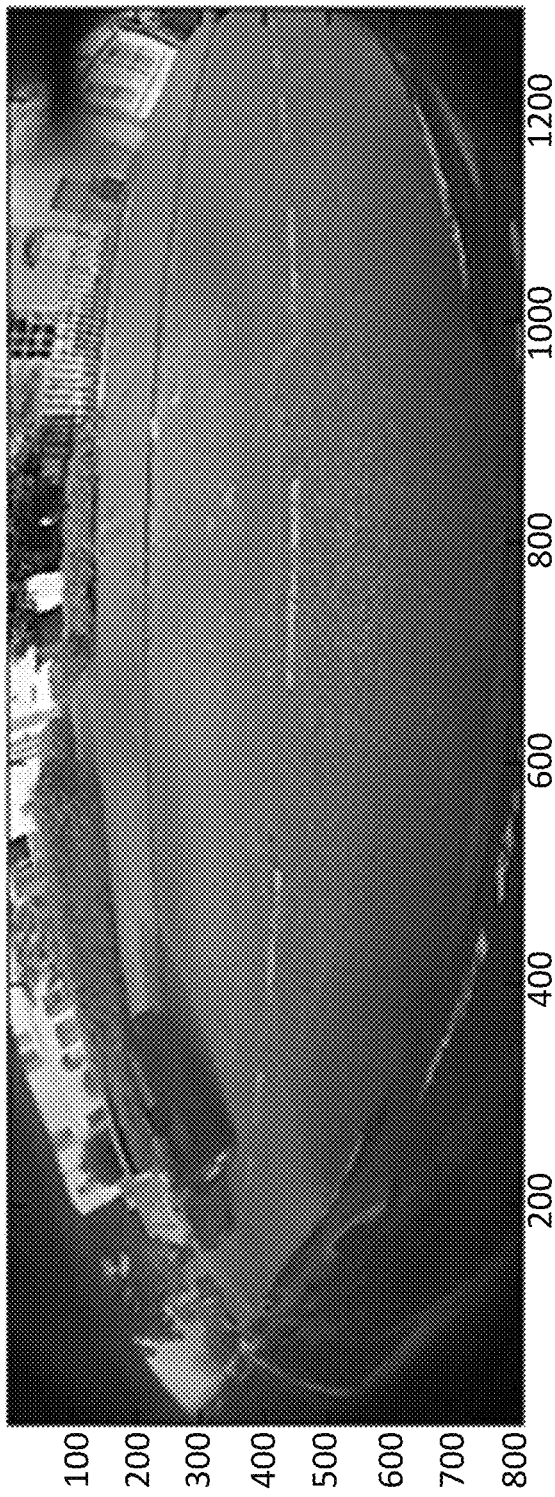
FIG. 15 shows a corrected image.
Figure 16:
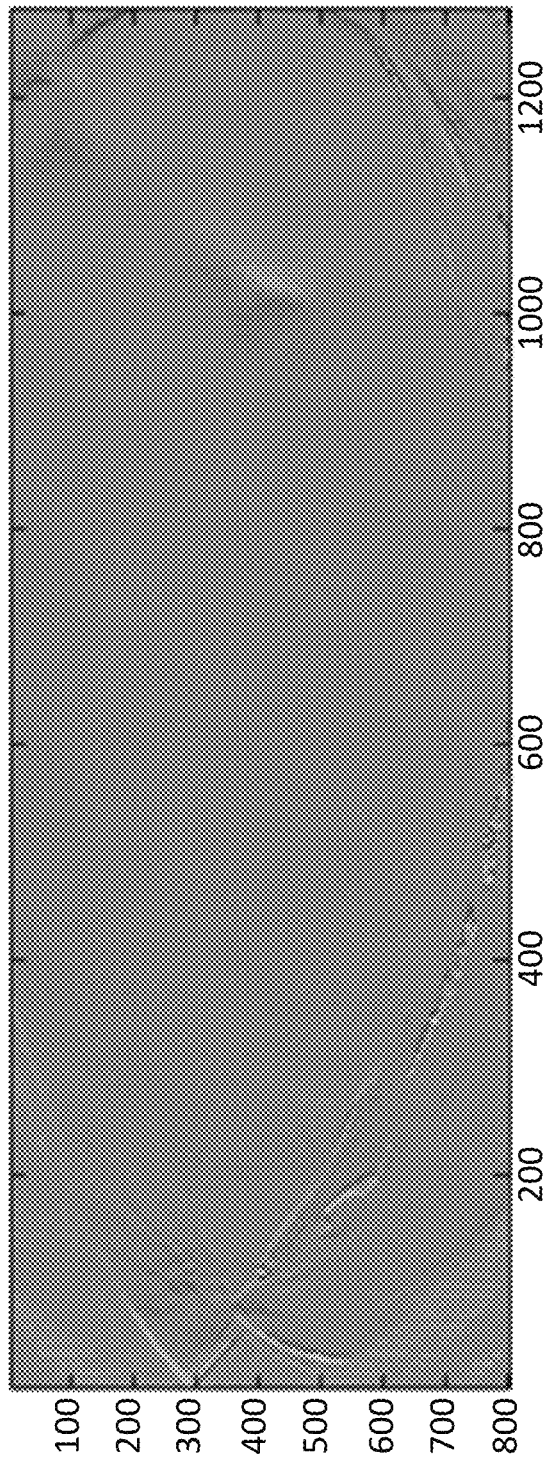
FIG. 16 shows a pixel variation measure in the x-direction of FIG. 14.
Figure 17:
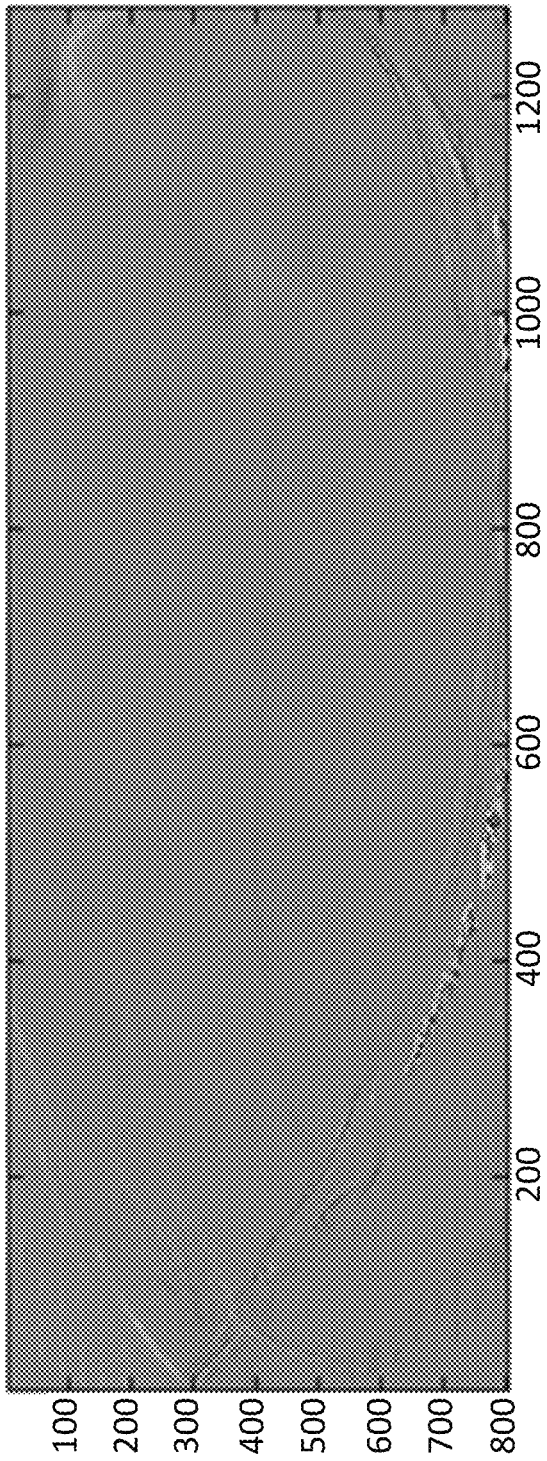
FIG. 17 shows a pixel variation measure in the y-direction of FIG. 14.
Figure 18:
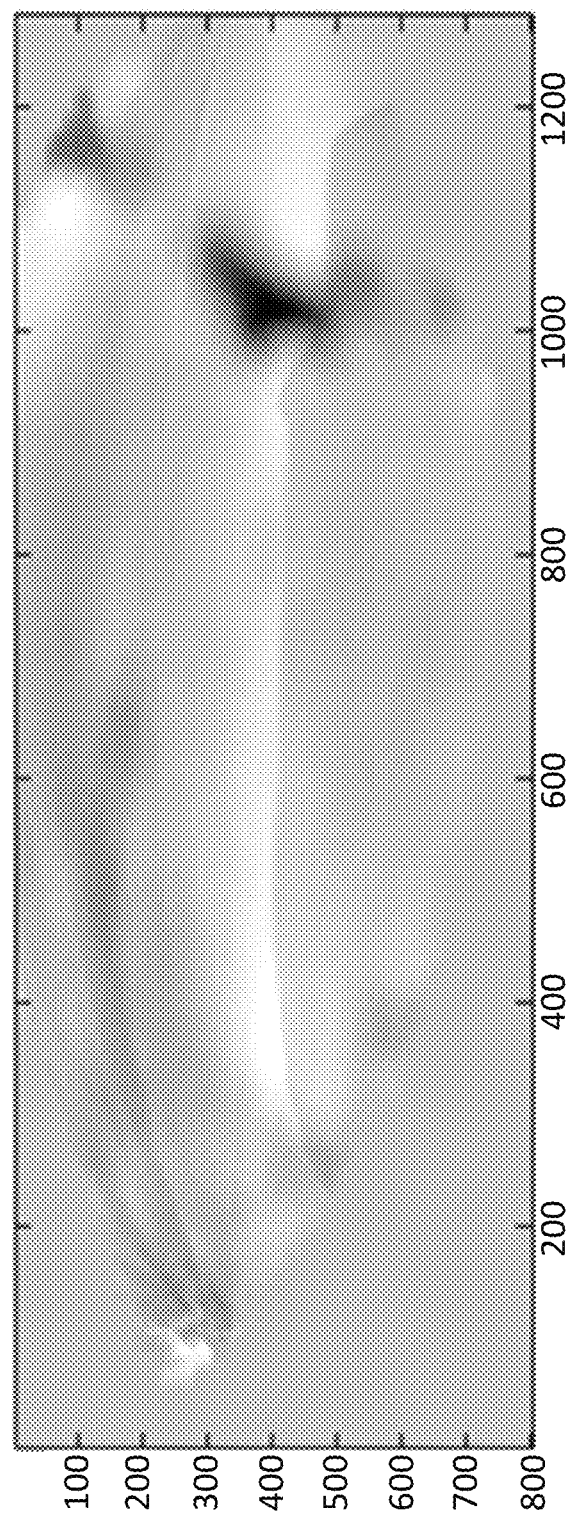
FIG. 18 shows an estimated image attenuation or blur mask.

FIGS. 14-18 show the analogous results to FIGS. 8 to 13 using the original image and a real contamination instead of an artificial blur mask. FIG. 14 shows the original image, FIG. 15 shows the corrected image using the below mentioned image correction method. FIG. 16 shows a pixel variation measure $\xi_x$ in the x-direction of FIG. 14 and FIG. 17 shows a pixel variation measure $\xi_y$ in the y-direction of FIG. 14. FIG. 18 shows an estimated blur mask or attenuation.

If natural image statistics holds and pixel intensities vary very little between consecutive pixels in most of the image, with very few exceptions, the intensities of neighboring pixels in the uncontaminated image are approximately equal, $$I_{0f}(x+1, y) \approx I_{0f}(x, y),$$

which means that a non-zero derivative at this pixel is caused by the influence of the attenuation factor B. Thereby the derivative equation becomes, in the pixels where this assumption holds, $$I_f(x+1, y) - I_f(x, y) = I_{0f}(x, y)B(x+1, y) - I_{0f}(x, y)B(x, y) = \quad (10)$$

$$I_{0f}(x, y)(B(x+1, y) - B(x, y)) =$$

-continued $$\frac{I_f(x, y)}{B(x, y)}(B(x+1, y) - B(x, y)) \Rightarrow \xi_x(x, y) :=$$

$$\frac{I_f(x+1, y)}{I_f(x, y)} = \frac{B(x+1, y)}{B(x, y)} \quad (5)$$

The previous equation shows that, in locations where the image varies smoothly, the quantity $\xi_x(x, y)$ depends only on B, which is constant in time during the recording of the video. Therefore, $\xi_x(x, y)$ is also constant in time. If $\xi_x(x, y)$ is not constant, it is because the initial assumption that the image varies smoothly is failing at that particular pixel and frame.

According to natural image statistics, this occurs rarely in natural images. The method according to the current specification takes this into account by considering these different values as outliers value of $\xi_x(x, y)$ with respect to time. To estimate the central value of $\xi_x(x, y)$, many techniques that deal with outliers can be used but arguably the best one is the median, which is a robust statistic with a breakdown percentage of 50%.

The estimation of the median value of $\xi_x(x, y)$ according to the definition of the median requires storing many frames and then, for each pixel, sorting the pixel intensity values at position (x, y) and obtaining the central one. This is in general not a practicable solution. According to the present specification an approximation to the median is computed instead, according to a method which is described below.

Streaming Median

Consider a one-dimensional sequence of numbers p(t), t∈ $\mathbb{N}_0$, and that we want to estimate an approximation of the median of all points observed up to the last observation t, m(t). Then an approximation of the median can be calculated according to the following method. A starting value m(−1) of the median estimate m(t) is initialized with some value (e.g., zero) and then, for each new observation p(t), compute $$m(t) = \begin{cases} m(t-1) + \Delta & \text{if } p(t) > m(t-1) \\ m(t-1) - \Delta & \text{if } p(t) < m(t-1) \\ m(t-1) & \text{otherwise} \end{cases} \quad (11)$$

where Δ is a suitably chosen value and t is a time index, such as the frame index f. This method does not require that all previous values of m are stored and does only a comparison and an addition per point and observation, which is very efficient from a computational and storage point of view. Also, as t→∞, m(t)→median({p(0), ..., p(t)}), or, in other words, the median estimate approaches the real value of the median for sufficiently large values of t.

Concerning the value of Δ, if Δ is too small, m(t) will tend towards the real value of the median too slowly. If Δ is too large, it will tend towards the value of the real median quickly but will then oscillate too much.

Although a constant value of Δ, which was obtained experimentally, is used in the exemplary embodiment of FIGS. 8-18, a possible approach could consist of starting with a large Δ for fast convergence and then, once m(t) stabilizes, a small Δ for increased precision.

Other approximations of values that are obtained by analyzing a ranked set of data can be obtained, too.

By making the upward and downward changes different, other approximations can be achieved. For example, the first and third quartiles can be computed respectively as:

$$\text{First quartile: } m(t) = \begin{cases} m(t-1) + \Delta/2 & \text{if } p(t) > m(t-1) \\ m(t-1) - 3\Delta/2 & \text{if } p(t) < m(t-1) \\ m(t-1) & \text{otherwise} \end{cases} \quad (12)$$

and $$\text{Third quartile: } m(t) = \begin{cases} m(t-1) + 3\Delta/2 & \text{if } p(t) > m(t-1) \\ m(t-1) - \Delta/2 & \text{if } p(t) < m(t-1) \\ m(t-1) & \text{otherwise} \end{cases} \quad (13)$$

Estimating the Attenuation Factor B

The attenuation factor B is estimated using the previously calculated streaming median method to estimate an approximation $\widetilde{\xi}_x(x, y)$ of the median value of $\xi_x(x, y)$ over time. Using the relationship $$\frac{I_f(x+1, y)}{I_f(x, y)} = \frac{B(x+1, y)}{B(x, y)} = \widetilde{\xi}_x(x, y) \quad (14)$$

obtained before, it follows that $$B(x+1,y) - B(x,y)\widetilde{\xi}_x(x,y) = 0, \quad (15)$$

which indicates how values of B are related with each other. A similar derivation shows for the vertical derivatives $$B(x,y+1) - B(x,y)\widetilde{\xi}_y(x,y) = 0, \quad (16)$$

where $\widetilde{\xi}_y$ is an estimate of the median of $$\xi_y(x, y) := \frac{I_f(x, y+1)}{I_f(x, y)}. \quad (17)$$

By setting some values of B to 1 in locations where it is determined that there is no attenuation or obstruction, a set of constraint equations for B(x, y) is obtained, $$B(x,y) = 1. \quad (18)$$

The pixel locations (x, y) may be obtained, for example, by using the detection method according to the first embodiment.

The equations (15), (16) and (18) can be represented in matrix form through the equation $$Sb = r, \quad (19)$$

where b represents the array B reshaped as a column vector with dimensions (#X×#Y)×1, wherein the vector b is formed by taking each row of B consecutively, S is a sparse matrix of size (#constraints)×(#X×#Y) and r is a column vector with dimensions (#constraints)×1.

The number of constraints "#constraints" is equal to the number of constraint equations (15), (16) and (18). The number of constraints is approximately (#X−1)*#Y horizontal constraints plus (#Y−1)*#X vertical constraints plus N constraints for N points in which B is known.

The matrix S is obtained by writing the constraints of equations (15), (16) and (18) into S. Each constraint is written into a row 1 of the sparse matrix S, wherein values of S, which are not assigned a value, have a value of zero. In particular, the matrix S can be stored efficiently in computer memory by only storing non-zero coefficients.

According to one embodiment, the matrix S is constructed as follows. The counter variable 1 is initialized with value 1 and is incremented with every new constraint that is added and the coordinate (x, y) traverses the pixel locations row by row starting with (x, y)=(1, 1). If there is a constraint for (x, y) from equation (15), coordinate (1, (y−1)*#X+x+1) of S is set to 1, coordinate (1, (y−1)*#X+x) is set to $-\bar{\xi}_x$ (x, y), and coordinate (1, 1) or r is set to 0. After adding this constraint, 1 is incremented by 1.

If there is a constraint for (x, y) from equation (16), coordinate (1, y*#X+x) of S is set to 1, coordinate (1, (y−1)*#X+x) of S is set to $-\bar{\xi}_y$ (x, y), and coordinate (1, 1) or r is set to 0. After adding this constraint, 1 is incremented by 1. If there is a constraint for (x, y) from equation (18) the coordinate (1, (y−1)*#X+x) of S is set to 1 and the coordinate (1, 1) of r is set to 1, and 1 is incremented by 1. Then, (x, y) is set to the next value and the procedure is repeated.

The resulting Equation (19) may in general be overdetermined and is not solved directly. Instead, both sides of the equation (19) are multiplied by $S^T$ from the left, thereby obtaining a symmetric matrix $S^T S$: $S^T S b = S^T r$. This equation is also known as a normal equation in the context of a least squares approximation. The normal equation is solved approximately with an iterative method, thereby obtaining the vector b. For example, the iterative method may be provided by a least square solver, such as the conjugate gradient method, which approximates the vector b that minimizes the quadratic form $\frac{1}{2}b^T S^T S b - b^T S^T r$.

The array B is obtained from the column vector b by reshaping the vector b back into array form. The unobserved image is estimated simply by dividing each pixel of the observed image with the estimated B for that pixel, $$I_0 f(x,y) = I_f(x,y)/B(x,y) \quad (20)$$

for pixels (x, y) with 0<B(x, y)<1. Thereby, an attenuation B(x, y) can be compensated.

According to a modified embodiment, constraint equations of equation (18) that are not needed are identified and are not included into the matrix S. For example, an algorithm may identify boundary regions of the artifacts and exclude points (x, y) outside the boundary regions from the equations (18) and from the vector b. Or, conversely, an algorithm may be used to identify interior regions with no attenuation, B=1 and exclude the points of the interior regions from the equations (18) and from the vector b.

Preferably, at least one constraint equation (18) is provided for each row of the image frames and, if present, for each column of the image frames. Thereby, the one or more known attenuation values B(x, y) can be used to find the attenuation using equations (15) and (16) in the pixel locations in which the attenuation is not known beforehand.

FIG. 19 shows, by way of example, an image defect correction system 10 according to the present application. A sensor surface 12 of a video camera is connected to an image capture unit 13 which is connected to a video buffer 14. An artifact detection unit 15 and an artifact correction unit 16 are connected to the video buffer 14. A display 17 is connected to the artifact correction unit 16. The dashed error indicates an optional use of an output of the artifact detection unit 15 as input for the artifact correction unit 16.

Furthermore, an image evaluation unit 19 is connected to the artifact correction unit 16. Various driver assistance units such as a brake assistant unit 20, a parking assistant unit 21 and a traffic sign detection unit 22 are connected to the image evaluation unit 19. The display 18 is connected to the units 20, 21, 22 for displaying output data of the units 20, 21 and 22.

The artifact detection unit 15 is operative to execute an artifact detection according to the first embodiment of the present specification and the artifact correction unit 16 is operative to execute an artifact correction method according to the second embodiment of the present specification, for example by providing a computing means such as a microprocessor, an integrated circuit, an ASIC, a computer readable memory for storing data and computer executable code etc.

Although the above description contains much specificity, these should not be construed as limiting the scope of the embodiments but merely providing illustration of the foreseeable embodiments. Especially the above stated advantages of the embodiments should not be construed as limiting the scope of the embodiments but merely to explain possible achievements if the described embodiments are put into practise. Thus, the scope of the embodiments should be determined by the claims and their equivalents, rather than by the examples given.

Among others, the pixel matrix may be traversed column-wise instead of row by row and the direction of traversing the matrix may be reversed. The constraint equation for the attenuation may be expressed in terms of the preceding pixel (x, y−1) or (x−1, y) instead of being expressed in terms of the next pixel (x, y+1) or (x+1, y). In this case, there is no constraint equation for the first column or for the first row, respectively.

The invention claimed is:

1. A method for detecting image artifacts, comprising:
receiving image data from a vehicle camera, the image data comprising image frames;
comparing intensity differences between neighboring pixels in a first direction with a pre-determined upper threshold and with a pre-determined lower threshold;
setting a pixel transition value to a first value when the intensity difference is greater than the pre-determined upper threshold, setting the pixel transition value to a second value when the intensity difference is less than the pre-determined lower threshold, and setting the pixel transition value to zero when the intensity difference lies between the pre-determined upper threshold and the pre-determined lower threshold;
computing accumulated pixel transition values of the pixel transition values by applying a low pass filter with respect to a frame index;
computing smoothed pixel transition values by applying a spatial filter with respect to pixel locations;
computing a magnitude value of the smoothed and accumulated pixel transition values for the pixel locations of the image frame; and
identifying pixels of potential artifact regions by comparing the magnitude value with a predetermined detection threshold.

2. The method of claim 1, further comprising:
comparing intensity differences between neighboring pixels in a second direction with the pre-determined upper threshold and with the pre-determined lower threshold; and
setting the pixel transition value to the first value when the intensity difference is greater than the pre-determined upper threshold, setting the pixel transition value to the second value when the intensity difference is less than the pre-determined lower threshold, and setting the pixel transition value to zero when the intensity difference lies between the pre-determined upper threshold and the pre-determined lower threshold.

3. The method of claim 1, wherein the computation of output values of the low pass filter comprises computing an accumulated value at a frame index f for the respective first or second direction as a weighted sum of the accumulated value at the earlier frame index f−1 and the smoothed pixel transition value at the earlier at frame index f.

4. The method of claim 3, wherein a weight factor of the accumulated value at the earlier frame index f−1 is at least 0.95.

5. A microprocessor for detecting image artifacts, comprising:
an input connection for receiving image data from a vehicle camera, the image data comprising image frames; and
an output connection for outputting locations of detected pixels;
wherein the microprocessor is operative to
compare intensity differences between neighboring pixels in a first direction with a pre-determined upper threshold and with a pre-determined lower threshold,
set a pixel transition value to a first value when the intensity difference is greater than the pre-determined upper threshold, setting the pixel transition value to a second value when the intensity difference is less than the pre-determined lower threshold and setting the pixel transition value to zero when the intensity difference lies between the pre-determined upper threshold and the pre-determined lower threshold,
compute accumulated pixel transition values of the pixel transition values by applying a low pass filter with respect to a frame index,
compute smoothed pixel transition values by applying a spatial filter with respect to pixel locations,
compute a magnitude value of the smoothed and accumulated pixel transition values for the pixel locations of the image frame, and
identify pixels of potential artifact regions by comparing the magnitude value with a predetermined detection threshold.

\* \* \* \* \*